(12) United States Patent
Nawani et al.

(10) Patent No.: US 10,179,321 B2
(45) Date of Patent: Jan. 15, 2019

(54) METHOD FOR REMOVAL OF METALS FROM AQUEOUS SOLUTIONS USING BIO ADSORBENTS

(71) Applicants: Neelu Nawani, Pune (IN); Prithviraj Desale, Pune (IN); Balasaheb Kapadnis, Pune (IN); Aminur Rahman, Skövde (SE); Noor Nahar, Skövde (SE); Abul Mandal, Skövde (SE)

(72) Inventors: Neelu Nawani, Pune (IN); Prithviraj Desale, Pune (IN); Balasaheb Kapadnis, Pune (IN); Aminur Rahman, Skövde (SE); Noor Nahar, Skövde (SE); Abul Mandal, Skövde (SE); Ghosh Sibdas, New Rochelle, NY (US)

(73) Assignee: DR. D. Y. PATIL VIDYAPEETH, Maharashtra (IN)

( * ) Notice: Subject to any disclaimer, the term of this patent is extended or adjusted under 35 U.S.C. 154(b) by 0 days.

(21) Appl. No.: 15/548,526

(22) PCT Filed: Jan. 25, 2016

(86) PCT No.: PCT/IB2016/050358
§ 371 (c)(1),
(2) Date: Aug. 3, 2017

(87) PCT Pub. No.: WO2016/125041
PCT Pub. Date: Aug. 11, 2016

(65) Prior Publication Data
US 2018/0029010 A1    Feb. 1, 2018

(30) Foreign Application Priority Data

Feb. 3, 2015   (IN) .............................. 17/MUM/2015

(51) Int. Cl.
*B01J 20/24* (2006.01)
*B01J 20/26* (2006.01)
(Continued)

(52) U.S. Cl.
CPC ............. *B01J 20/24* (2013.01); *B01J 20/261* (2013.01); *B01J 20/267* (2013.01);
(Continued)

(58) Field of Classification Search
CPC ............ B01J 20/28004; B01J 20/28016; B01J 20/2803; B01J 20/28033; B01J 20/3021;
(Continued)

(56) References Cited

U.S. PATENT DOCUMENTS

| 3,557,024 A * | 1/1971 | Grant et al. ........... B01J 29/146 502/66 |
| 5,010,181 A * | 4/1991 | Coughlin .................. B01J 20/24 210/668 |
| 5,084,389 A | 1/1992 | Lakshmanan |
| 5,705,030 A * | 1/1998 | Gassner, III ............. D01B 3/00 162/1 |
| 7,611,831 B2 * | 11/2009 | Hei ........................... A61L 2/00 424/529 |

(Continued)

FOREIGN PATENT DOCUMENTS

GB          1395462 A      5/1975

*Primary Examiner* — Ana M Fortuna
(74) *Attorney, Agent, or Firm* — Baker and Rannells, PA

(57) ABSTRACT

The present invention provides a method (100) for removal of metals from aqueous solutions comprising the steps of treating (102) the aqueous solutions with an adsorbent, allowing (104) the aqueous solutions and the adsorbent to be in contact for a predetermined time to obtain treated aqueous solutions, collecting (106) the treated aqueous solutions, filtering (108) the treated aqueous solutions and discharging (110) the filtered aqueous solutions. The adsorbent comprising plurality of natural biomaterials. Further, the plurality of natural biomaterials are capable of adsorbing the metals from the aqueous solutions.

17 Claims, 16 Drawing Sheets

(51) Int. Cl.
*B01J 20/28* (2006.01)
*B01J 20/30* (2006.01)
*C02F 101/10* (2006.01)
*C02F 101/20* (2006.01)
*C02F 101/22* (2006.01)
*C02F 1/28* (2006.01)

(52) U.S. Cl.
CPC ..... *B01J 20/2803* (2013.01); *B01J 20/28004* (2013.01); *B01J 20/28016* (2013.01); *B01J 20/28033* (2013.01); *B01J 20/3021* (2013.01); *B01J 20/3042* (2013.01); *B01J 20/3071* (2013.01); *C02F 1/286* (2013.01); *B01J 2220/485* (2013.01); *B01J 2220/4825* (2013.01); *B01J 2220/4837* (2013.01); *B01J 2220/4843* (2013.01); *B01J 2220/4875* (2013.01); *B01J 2220/4881* (2013.01); *C02F 2101/103* (2013.01); *C02F 2101/20* (2013.01); *C02F 2101/22* (2013.01)

(58) Field of Classification Search
CPC ............... B01J 20/3042; B01J 20/3071; B01J 2220/4825; B01J 2220/4881
See application file for complete search history.

(56) References Cited

U.S. PATENT DOCUMENTS

| | | | | |
|---|---|---|---|---|
| 7,678,351 | B2* | 3/2010 | Iyer | B01J 20/043 |
| | | | | 423/175 |
| 8,932,983 | B1* | 1/2015 | Harris | C02F 1/286 |
| | | | | 502/400 |
| 9,891,861 | B2* | 2/2018 | Hegde | G06F 3/0652 |
| 2002/0108903 | A1 | 8/2002 | Homonoff | |
| 2007/0262026 | A1* | 11/2007 | Cuero | B01D 15/00 |
| | | | | 210/682 |
| 2008/0134888 | A1* | 6/2008 | Chao | B01D 53/10 |
| | | | | 95/134 |
| 2011/0117201 | A1* | 5/2011 | Das | B01J 20/103 |
| | | | | 424/489 |
| 2012/0103915 | A1* | 5/2012 | Das | C02F 1/28 |
| | | | | 210/724 |
| 2014/0110316 | A1* | 4/2014 | Shiue | B01D 41/02 |
| | | | | 210/85 |
| 2014/0284281 | A1 | 9/2014 | Al-Jlil | |
| 2015/0273131 | A1* | 10/2015 | Malmborg | A61M 1/1696 |
| | | | | 210/660 |
| 2018/0029010 | A1* | 2/2018 | Nawani | B01J 20/28033 |

* cited by examiner (a)          (b)

METHOD FOR REMOVAL OF METALS FROM AQUEOUS SOLUTIONS USING BIO ADSORBENTS

FIELD OF THE INVENTION

The present invention generally relates to treatment of aqueous solutions containing metals and more particularly, to a method for removal of metals from aqueous solutions using natural biomaterials and/or microorganisms.

BACKGROUND OF THE INVENTION

Wastewater treatment is a process which makes polluted water suitable for domestic or industrial use. The polluted water may contain undesirable and toxic contaminants, in particular metal contaminants. Further, the water can be polluted by human waste, industry waste, agricultural waste or any other source. Such polluted water and also any other polluted liquids are hazardous to environment if they are released into rivers, streams or sewers directly. Therefore, treatment of such polluted water and any other polluted liquids is of utmost importance in view of the damage to the environment as well as stringent environmental regulations.

Numerous techniques for metal removal and recovery processes are known including precipitation, absorption and biosorption, electro-winning and electrocoagulation, cementation, membrane separation (reverse osmosis and electro dialysis), solvent extraction and ion exchange. However, these techniques have limited applicability.

There have been a number of solutions provided for improved and efficient metal removal from contaminated aqueous solutions and few of them have been discussed below:

U.S. Pat. No. 4,992,179A describes a process for treating an aqueous solution containing heavy metal cations to remove the cations by sorption and recover the metal cations using microbial cells having metal uptake properties. A biomass reaction product is produced by treating the cells with a caustic solution, whereby the biomass reaction product after drying is having substantially enhanced uptake of the metal cations from the aqueous solution.

Another method of removing metal ions is disclosed in U.S. Pat. No. 6,379,551B1. The disclosed method removes metal ions from an organic fluid containing metal ions using an ion exchange membrane. The ion exchange membrane is having a porous polymeric support grafted with an organic moiety to which at least one ion exchange group is covalently bonded. Further, a filtration apparatus is disclosed for removing ions from the fluid using the ion exchange membrane.

Yet another method for removing heavy metals from contaminated water is disclosed in U.S. Pat. No. 8,419,946B2. An adsorbent composition for removing heavy metals from contaminated water is also disclosed. In the method, a stream of water having a concentration of one or more heavy metals is passed through adsorbent comprising granules. The granules are made of a mixture of from about 1 wt % to about 15 wt % clay and a thermoplastic polymer matrix.

The aforesaid documents and similar disclosures which talk about varied methods for removal of metals from the contaminated aqueous solution comprises number of shortcomings and drawbacks such as limited applicability, energy requirement, low absorption capacity and requirement for precise control. Further, synthetic ion-exchange resins used in the conventional methods require reverse flushing of packed column to regenerate the resin, whereby a metal contaminated flushing fluid is produced which makes disposal difficult. Also, ion exchange media selected according to the ion-exchange resins used, may have limited flow rates and channeling problems. In addition, the existing methods are expensive, complex and time consuming.

Accordingly, there remains a need in the prior art to have an improved method for removal of metals from aqueous solutions which overcomes the aforesaid problems and shortcomings.

However, there remains a need in the art for a method for removal of metals from aqueous solutions. The proposed method utilizes natural biomaterials and/or microorganisms for the removal of metals from the aqueous solutions. Further, the method is easy, cost effective and environmental friendly.

OBJECT OF THE INVENTION

It is an object of the present invention to provide a method for removal of metals from aqueous solutions. Further, another object of the present invention is to employ microbial biomass and natural biomaterials such as agro-waste, seafood waste for removal of the metals from the aqueous solutions. Also, it is an object of the present invention to prepare an adsorbent from the natural biomaterials in the form of membranes, beads, granules, serpentines and filter beds for the removal of the metals.

SUMMARY OF THE INVENTION

Embodiments of the present invention aim to provide a method for removal of metals from aqueous solutions. The disclosed method employs natural biomaterials or microorganisms for the removal of metals from the aqueous solutions. Further, the natural biomaterials are converted into matrices such as flat-bed membranes, membrane discs, composite membranes, granules, beads, filter beds, serpentines.

In accordance with an embodiment of the present invention, the method for removal of metals from aqueous solutions comprising the steps of treating the aqueous solutions with an adsorbent, allowing the aqueous solutions and the adsorbent to be in contact for a predetermined time to obtain treated aqueous solutions, collecting the treated aqueous solutions, filtering the treated aqueous solutions and discharging the filtered aqueous solutions. The adsorbent comprises plurality of natural biomaterials. Further, the plurality of natural biomaterials are capable of adsorbing the metals from the aqueous solutions.

In accordance with an embodiment of the present invention, the aqueous solutions are treated with an adsorbent having a microbial biomass capable of adsorbing the metals from the aqueous solutions.

In accordance with an embodiment of the present invention, the microbial biomass is selected from, but not limited to, a group consisting of filamentous and non-filamentous bacteria, fungi and algae.

In accordance with an embodiment of the present invention, the microbial biomass is selected from, but not limited to, a group consisting of *Lysinibacillus* species, *Streptomyces* species, *Pseudomonas* species, *Stenotrophomonas* species and algae.

In accordance with an embodiment of the present invention, the adsorbent is provided in a form of, but not limited to, membranes, beads, granules, serpentines and filter beds. The membranes are, but not limited to, flat-bed membranes, membrane discs, composite membranes and dual composite membranes. Further, the beads are, but not limited to, gelatinous beads and solid beads.

In accordance with an embodiment of the present invention, the plurality of natural biomaterials are selected from, but not limited to, a group consisting of agro-waste, seafood waste, lignocellulosic waste and non-edible plant waste. The agro-waste is selected from, but not limited to a group consisting of fruit peels, corn cobs, sawdust, vegetables and lignocellulosic wastes. Further, the seafood waste is selected from, but not limited to, a group consisting of shrimp shells, crab shells, shell fish waste, fish scales, non-edible parts of fish and non-edible parts of seafood.

In accordance with an embodiment of the present invention, the aqueous solutions are selected from, but not limited to, a group consisting of industrial effluents, domestic wastewater, natural water, water used in agriculture, blood and body fluids.

In accordance with an embodiment of the present invention, the metals are selected from, but not limited to, a group consisting of heavy metals and metalloids. Further, the heavy metals and the metalloids are selected from, but not limited to, a group consisting of iron, nickel, lead, cadmium, mercury, zinc, copper, manganese, cobalt, boron, molybdate, arsenic, chromium, silver, aluminum and strontium.

In accordance with an embodiment of the present invention, the plurality of natural biomaterials are blended with a binding agent. Further, the binding agent is selected from, but not limited to, a group consisting of polyethylene glycol, agar, gelatin, cellulose, guar gum or a combination thereof.

In accordance with an embodiment of the present invention, the predetermined time is in the range of, but not limited to, 1 hour to 48 hours.

In accordance with an embodiment of the present invention, a method of preparation of an adsorbent in a granular form comprising the steps of pulverizing plurality of natural biomaterials to form a powder, washing the powder with deionized water and allowing the powder to dry, mixing the dried powder with a binding agent and kneading with a solvent to form a paste, preparing granules from the paste and allowing the granules to harden. Further, the granules are capable of adsorbing metals of the aqueous solutions.

In accordance with an embodiment of the present invention, the plurality of natural biomaterials are selected from, but not limited to, a group consisting of agro-waste, seafood waste, lignocellulosic waste and non-edible plant waste. The agro-waste is selected from, but not limited to, a group consisting of banana skin, lemon, lime, pomegranate, water melon, sapodilla, pineapple, orange peels, wheat bran and rice husk. Further, the seafood waste is selected from, but not limited to, a group consisting of shrimp shells, crab shells, shell fish waste, fish scales, non-edible parts of fish and non-edible parts of seafood.

In accordance with an embodiment of the present invention, the powder is dried at a temperature of 100° C. for a time period in the range of, but not limited to, 24 to 48 hours.

In accordance with an embodiment of the present invention, the solvent is selected from, but not limited to, a group consisting of water, an acid solution and an alkali solution. Further, the acid solution is selected from, but not limited to, a group consisting of 2% acetic acid solution and 1 N hydrochloric acid.

In accordance with an embodiment of the present invention, the binding agent is, but not limited to, guar gum.

In accordance with an embodiment of the present invention, the granules are having a diameter in the range of, but not limited to, 3 mm to 5 mm. Further, the granules are allowed to harden at a temperature of, but not limited to, 50° C.

In accordance with an embodiment of the present invention, the aqueous solutions are selected from, but not limited to, a group consisting of industrial effluents, domestic wastewater, natural water, water used in agriculture, blood and body fluids.

In accordance with an embodiment of the present invention, the metals are selected from, but not limited to, a group consisting of heavy metals and metalloids.

In accordance with an embodiment of the present invention, the adsorbent is, but not limited to, in a form of beads.

In accordance with an embodiment of the present invention, a method of preparation of an adsorbent in a form of membrane comprising the steps of crushing plurality of natural biomaterials, washing the crushed plurality of natural biomaterials with deionized water and allowing the crushed plurality of natural biomaterials to dry, grinding the dried crushed plurality of natural biomaterials to form a powder, mixing the powder with a first binding agent and the deionized water to form a mixture, stirring the mixture and adding the deionized water in the mixture to form a slurry, keeping the slurry in a water bath, adding a plasticizer in the slurry and keeping the slurry in the water bath to form a viscous slurry and casting the viscous slurry on a substrate and air dried to form the membrane.

In accordance with an embodiment of the present invention, the crushed plurality of natural biomaterials are dried at a temperature of, but not limited to, 50° C. until complete dryness.

In accordance with an embodiment of the present invention, the first binding agent is, but not limited to, guar gum.

In accordance with an embodiment of the present invention, the mixture is stirred for a time period in the range of, but not limited to, 15 mins to 20 mins.

In accordance with an embodiment of the present invention, the slurry is stirred for a time period in the range of, but not limited to, 5 mins to 10 mins.

In accordance with an embodiment of the present invention, the slurry is kept in the water bath at a temperature of 60° C. for 30 mins.

In accordance with an embodiment of the present invention, the plasticizer is selected from, but not limited to, a group consisting of glycerol and sorbitol.

In accordance with an embodiment of the present invention, the slurry is kept in a hot air oven at a temperature of 60° C. till 5 mins.

In accordance with an embodiment of the present invention, the viscous slurry is air dried for a time period in the range of, but not limited to, 60 mins to 120 mins until 95% of moisture dries.

In accordance with an embodiment of the present invention, the substrate is, but not limited to, a glass plate.

In accordance with an embodiment of the present invention, the membrane is, but not limited to, a flat-bed membrane.

In accordance with an embodiment of the present invention, the viscous slurry is spread on an ultrafiltration membrane backing material, rolled evenly and air dried for a time period in the range of, but not limited to, 60 mins to 120 mins to form a composite membrane.

In accordance with an embodiment of the present invention, the step of stirring further comprises addition of a second binding agent in the slurry for rigidity. Further, the second binding agent is, but not limited to, agar powder.

In accordance with an embodiment of the present invention, the plurality of natural biomaterials are selected from, but not limited to, a group consisting of agro-waste, seafood waste, lignocellulosic waste and non-edible plant waste.

In accordance with an embodiment of the present invention, a method of preparation of an adsorbent from a microbial biomass comprising the steps of cultivating microbial cells in a growth media, harvesting the microbial cells to obtain the microbial biomass, treating the microbial biomass at predetermined treating conditions, adding a cross-linking agent in the treated microbial biomass to form intertwined microbial matrices of the microbial biomass and drying the intertwined microbial matrices to form the adsorbent.

In accordance with an embodiment of the present invention, the microbial cells are selected from, but not limited to, a group consisting of filamentous and non-filamentous bacteria, fungi and algae.

In accordance with an embodiment of the present invention, the microbial cells are selected from, but not limited to, a group consisting of *Lysinibacillus* species, *Streptomyces* species, *Pseudomonas* species, *Stenotrophomonas* species and algae.

In accordance with an embodiment of the present invention, the microbial biomass is treated at a temperature of, but not limited to, 100° C. or at a temperature of 121° C. at 15 psi.

In accordance with an embodiment of the present invention, the microbial biomass is treated with, but not limited to, 1 N HCl for 30 min.

In accordance with an embodiment of the present invention, the microbial biomass is treated with, but not limited to, 5 N HCl.

In accordance with an embodiment of the present invention, the cross-linking agent is selected from, but not limited to, a group consisting of epichlorohydrin and glycerol.

In accordance with an embodiment of the present invention, the intertwined microbial matrices are blended with, but not limited to, binding agents. Further, the binding agents are selected from, but not limited to, a group consisting of polyethylene glycol, agar, gelatin, cellulose, guar gum or a combination thereof.

In accordance with an embodiment of the present invention, the intertwined microbial matrices are integrated with, but not limited to, Shrimp-PET composites. The Shrimp-PET composites are composites of shrimp shell waste with polyethylene terephthalate (PET).

In accordance with an embodiment of the present invention, the Shrimp-PET composites are integrated with, but not limited to, intertwined bacterial matrices.

In accordance with an embodiment of the present invention, the Shrimp-PET composites are integrated with, but not limited to, intertwined actinomycete matrices.

In accordance with an embodiment of the present invention, the Shrimp-PET composites are integrated with, but not limited to, intertwined fungal matrices.

In accordance with an embodiment of the present invention, the Shrimp-PET composites are integrated with, but not limited to, intertwined algal matrices.

In accordance with an embodiment of the present invention, the adsorbent is prepared in a form of beads and membranes.

In accordance with an embodiment of the present invention, the adsorbent is prepared from a mixture of uniformly mixed plurality of natural biomaterials alone or with the microbial biomass. Further, the plurality of natural biomaterials are selected from, but not limited to, a group consisting of lignocellulosic waste powder, shrimp shell powder and seafood waste powder.

BRIEF DESCRIPTION OF THE DRAWINGS

So that the manner in which the above recited features of the present invention can be understood in detail, a more particular to the description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, the invention may admit to other equally effective embodiments.

These and other features, benefits and advantages of the present invention will become apparent by reference to the following text figure, with like reference numbers referring to like structures across the views, wherein.

*Stenotrophomonas* sp. and the adsorbents respectively improved with the Shrimp-PET (D to F) in accordance with an embodiment of the present invention.

Figure 15:
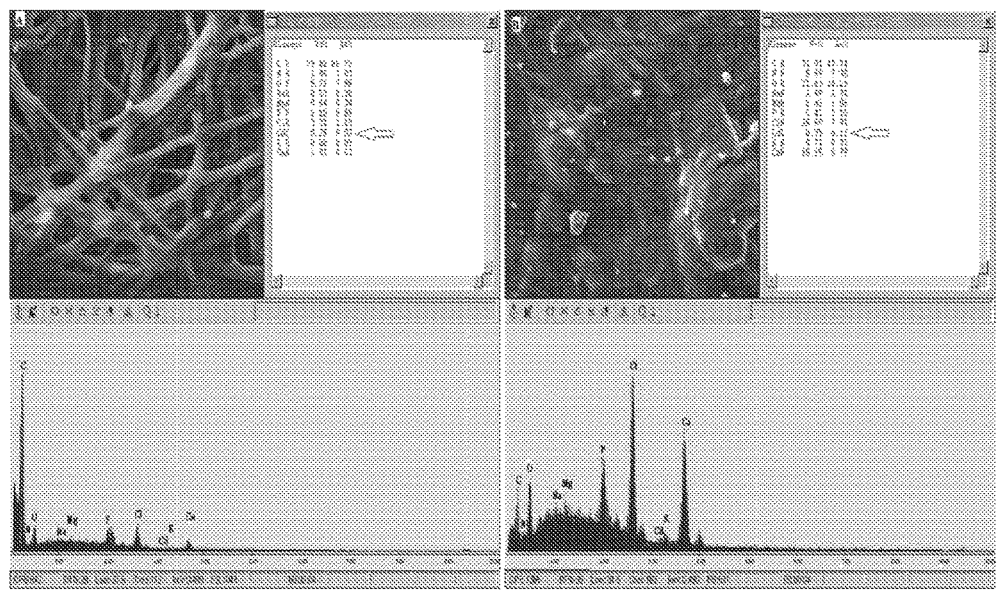

FIG. 15 illustrates cadmium adsorbed over the (A) PET and the (B) Shrimp-PET composite and the corresponding spectra in accordance with an embodiment of the present invention.

Figure 16:
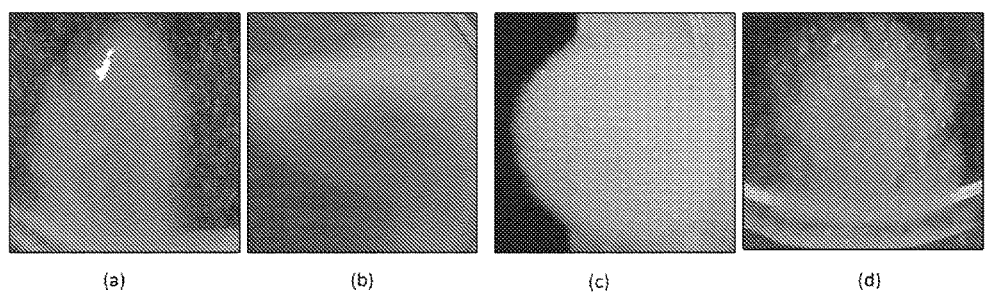

FIG. 16 illustrates intactness of the adsorbent in the form of beads prepared from (a) actinomycete biomass and (c) algal biomass in water after 24 hours and 48 hours respectively, and copper adsorbed over the beads prepared from the (b) actinomycetes biomass and the (d) algal biomass in accordance with an embodiment of the present invention.

DETAILED DESCRIPTION OF THE DRAWINGS

The present invention is described hereinafter by various embodiments with reference to the accompanying drawing, wherein reference numerals used in the accompanying drawing correspond to the like elements throughout the description. This invention may, however, be embodied in many different forms and should not be construed as limited to the embodiment set forth herein. Rather, the embodiment is provided so that this disclosure will be thorough and complete and will fully convey the scope of the invention to those skilled in the art. In the following detailed description, numeric values and ranges are provided for various aspects of the implementations described. These values and ranges are to be treated as examples only, and are not intended to limit the scope of the claims. In addition, a number of materials are identified as suitable for various facets of the implementations. These materials are to be treated as exemplary, and are not intended to limit the scope of the invention. As used throughout this description, the word "may" is used in a permissive sense (i.e. meaning having the potential to), rather than the mandatory sense (i.e. meaning must). Further, the words "a" or "an" means "at least one" and the word "plurality" means "one or more" unless otherwise mentioned. Furthermore, the terminology and phraseology used herein is solely used for descriptive purposes and should not be construed as limiting in scope. Language such as "including", "comprising", "having", "containing", or "involving" and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes. Any discussion of documents, acts, materials, devices, articles and the likes are included in the specification solely for the purpose of providing a context for the present invention. In this disclosure, whenever an element or a group of elements is preceded with the transitional phrase "comprising", it is understood that we also contemplate the same composition, element or group of elements with transitional phrases "consisting of", "consisting", "selected from the group of consisting of", "including", or "is" preceding the recitation of the composition, element or group of elements and vice versa.

Figure 1:
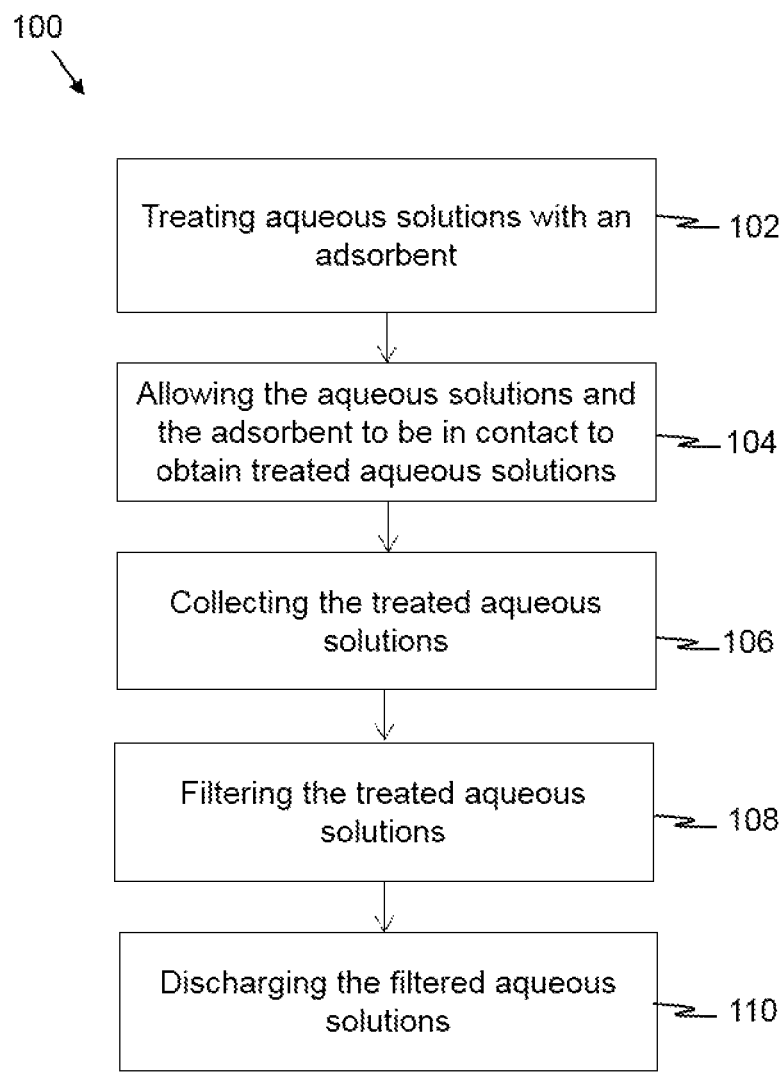
FIG. 1 is a flow chart illustrating a method for removal of metals from aqueous solutions in accordance with an embodiment of the present invention.

FIG. 1 is a flow chart illustrating a method (100) for removal of metals from aqueous solutions in accordance with an embodiment of the present invention.

At step 102, as shown in FIG. 1, the aqueous solutions are treated with an adsorbent. The adsorbent comprises plurality of natural biomaterials. Further, the plurality of natural biomaterials are selected from, but not limited to, a group consisting of agro-waste, seafood waste, lignocellulosic waste and non-edible plant waste. Also, the plurality of natural biomaterials are used alone or in combinations.

In accordance with an embodiment of the present invention, the agro-waste is selected from, but not limited to, a group consisting of fruit peels, corn cobs, sawdust, vegetables and lignocellulosic wastes. Further, the seafood waste is selected from, but not limited to, a group consisting of shrimp shells, crab shells, shell fish waste, fish scales, non-edible parts of fish and non-edible parts of seafood.

In accordance with an embodiment of the present invention, the adsorbent is provided in a form of, but not limited to, membranes, beads, granules, serpentines and filter beds. The membranes are, but not limited to, flat-bed membranes, membrane discs, composite membranes and dual composite membranes. Further, the beads are, but not limited to, gelatinous beads and solid beads.

At step 104, the aqueous solutions and the adsorbent are allowed to be in contact for a predetermined time to obtain treated aqueous solutions. Further, the predetermined time is in the range of, but not limited to, 1 hour to 48 hours.

In accordance with an embodiment of the present invention, the plurality of natural biomaterials are capable of adsorbing the metals from the aqueous solutions. Further, the plurality of natural biomaterials are blended with a binding agent. The plurality of natural biomaterials are also blended with each other, natural or synthetic blending agents or natural or synthetic polymers to give the adsorbent desirable mechanical properties for adsorption of the metals from the aqueous solutions. Also, the binding agent is selected from, but not limited to, a group consisting of polyethylene glycol, agar, gelatin, cellulose, guar gum or a combination thereof.

In accordance with an embodiment of the present invention, the metals are selected from, but not limited to, a group consisting of heavy metals and metalloids. Further, the heavy metals and metalloids are selected from, but not limited to, a group consisting of iron, nickel, lead, cadmium, mercury, zinc, copper, manganese, cobalt, boron, molybdate, arsenic, chromium, silver, aluminum and strontium. Also, the aqueous solutions are selected from, but not limited to, a group consisting of industrial effluents, domestic wastewater, natural water, water used in agriculture, blood and body fluids.

In accordance with an embodiment of the present invention, the aqueous solutions are treated with an adsorbent having a microbial biomass capable of adsorbing the metals from the aqueous solutions. The microbial biomass is selected from, but not limited to, a group consisting of filamentous and non-filamentous bacteria, algae and fungi. Further, the microbial biomass is selected from, but not limited to, a group consisting of *Lysinibacillus* species, *Streptomyces* species, *Pseudomonas* species, *Stenotrophomonas* species and algae.

At step 106, the treated aqueous solutions are collected. The treated aqueous solutions contain a negligible or reduced concentration of the metals due to the adsorption of the metals on the adsorbent.

In accordance with an embodiment of the present invention, the steps 102 to 106 are repeated upon detection of the metals in the treated aqueous solutions.

At step 108, the treated aqueous solutions are filtered. Further, the treated aqueous solutions are filtered through a coarse filter paper when no metal is detected in the treated aqueous solutions.

At step 110, the filtered aqueous solutions are discharged. Further, the filtered aqueous solutions are free of any metal contamination.

Figure 2:
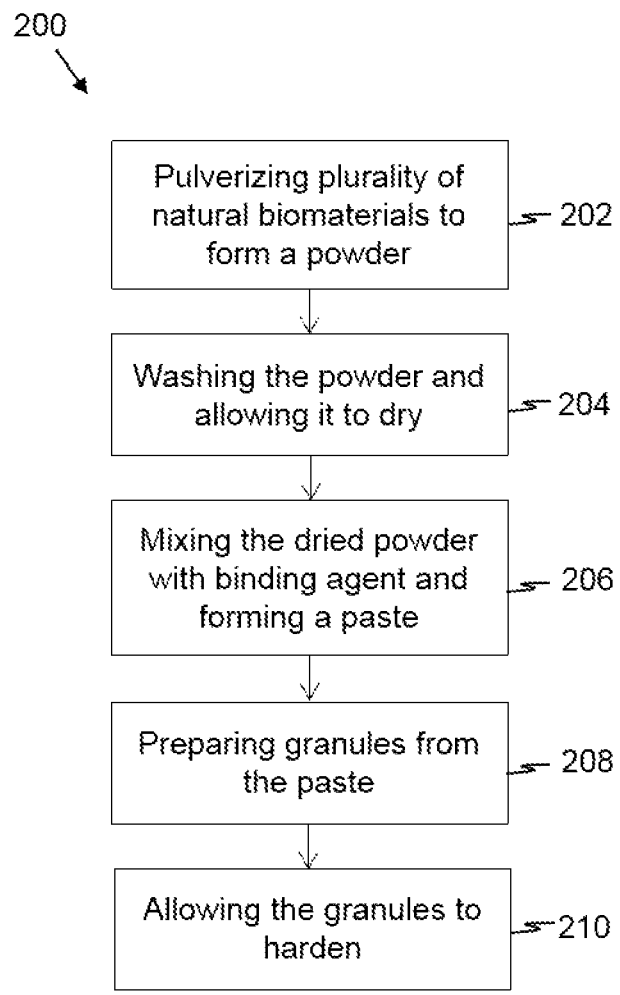
FIG. 2 is a flow chart illustrating a method of preparation of an adsorbent in a granular form in accordance with an embodiment of the present invention.

FIG. 2 is a flow chart illustrating a method (200) of preparation of an adsorbent in a granular form in accordance with an embodiment of the present invention.

At step 202, as shown in FIG. 2, the plurality of natural biomaterials are pulverized to form a powder. Further, the plurality of natural biomaterials are selected from, but not limited to, a group consisting of agro-waste, seafood waste, lignocellulosic waste and non-edible plant waste.

In accordance with an embodiment of the present invention, the agro-waste is selected from, but not limited to, a group consisting of banana skin, lemon, lime, pomegranate, water melon, sapodilla, pineapple, orange peels, wheat bran and rice husk. Further, the seafood waste is selected from, but not limited to, a group consisting of shrimp shells, crab shells, shell fish waste, fish scales, non-edible parts of fish and non-edible parts of seafood.

At step 204, the powder is washed with deionized water and allowed to dry. Further, the powder is dried at a temperature of 100° C. for a time period in the range of, but not limited to, 24 to 48 hours. Furthermore, duration of drying of the powder varies with the plurality of natural biomaterials used.

At step 206, the dried powder is mixed with a binding agent and kneaded with a solvent to form a paste. Further, the binding agent is, but not limited to, guar gum.

In accordance with an embodiment of the present invention, the solvent is selected from, but not limited to, a group consisting of water, an acid solution and an alkali solution. Further, the acid solution is, but not limited to, 2% acetic acid solution or 1 N hydrochloric acid (HCl).

At step 208, granules are prepared from the paste. Further, the granules are having a diameter in the range of, but not limited to, 3 mm to 5 mm.

At step 210, the granules are allowed to harden. The granules are allowed to harden at a temperature of 50° C. till desired consistency. Further, the granules are capable of adsorbing the metals of the aqueous solutions.

In accordance with an embodiment of the present invention, the metals are selected from, but not limited to, a group consisting of heavy metals and metalloids. Further, the aqueous solutions are selected from, but not limited to, a group consisting of industrial effluents, domestic wastewater, natural water, water used in agriculture, blood and body fluids.

In accordance with an embodiment of the present invention, the adsorbent is in a form of, but not limited to, beads.

Figure 3:
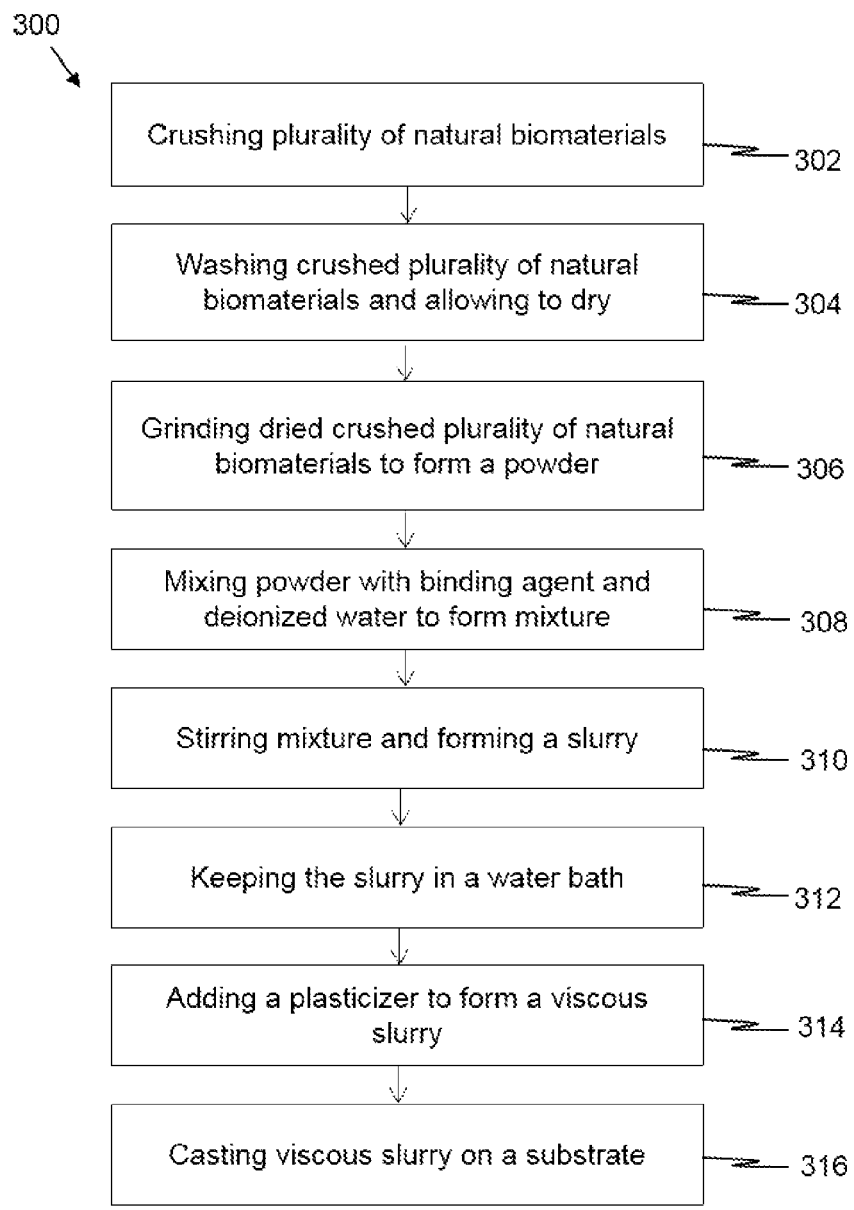
FIG. 3 is a flow chart illustrating a method of preparation of an adsorbent in a form of membrane in accordance with another embodiment of the present invention.

FIG. 3 is a flow chart illustrating a method (300) of preparation of an adsorbent in a form of membrane in accordance with another embodiment of the present invention.

At step 302, the plurality of natural biomaterials are crushed into small pieces. Further, the plurality of natural biomaterials are selected from, but not limited to, a group consisting of agro-waste, seafood waste, lignocellulosic waste and non-edible plant waste.

At step 304, the crushed plurality of natural biomaterials are washed with the deionized water and allowed to dry. Further, the crushed plurality of natural biomaterials are dried at a temperature of 50° C. until complete dryness. Furthermore, duration of drying of the crushed plurality of natural biomaterials varies with moisture content and the plurality of natural biomaterials used.

At step 306, the dried crushed plurality of natural biomaterials are ground in a mixer to form a powder.

At step 308, the powder is mixed with a first binding agent and the deionized water to form a mixture. Further, the first binding agent is, but not limited to, guar gum.

At step 310, the mixture is stirred and the deionized water is added in the mixture to form a slurry. Further, the mixture is stirred for a time period in the range of, but not limited to, 15 mins to 20 mins. Also, the slurry is stirred for a time period in the range of, but not limited to, 5 mins to 10 mins.

In accordance with an embodiment of the present invention, the step 310 further comprises addition of a second binding agent in the slurry for rigidity. Further, the second binding agent is, but not limited to, agar powder.

At step 312, the slurry is kept in a water bath. Further, the slurry is kept in the water bath at a temperature of 60° C. for 30 mins.

At step 314, a plasticizer is added in the slurry and kept in the water bath to form a viscous slurry. The slurry having the plasticizer is kept in the water bath at the temperature of 60° C. for 30 mins. Further, the plasticizer is, but not limited to, glycerol or sorbitol.

In accordance with an embodiment of the present invention, the slurry is kept in a hot air oven at a temperature of 60° C. till 5 mins.

At step 316, the viscous slurry is casted on a substrate and air dried to form the membrane. The viscous slurry is air dried for a time period in the range of, but not limited to, 60 mins to 120 mins until 95% of moisture dries. Further, the substrate is, but not limited to, a glass plate. Also, the membrane is a flat-bed membrane.

In accordance with an embodiment of the present invention, the viscous slurry is spread on an ultrafiltration membrane backing material, rolled evenly and air dried for a time period in the range of, but not limited to, 60 mins to 120 mins to form a composite membrane.

Figure 4:
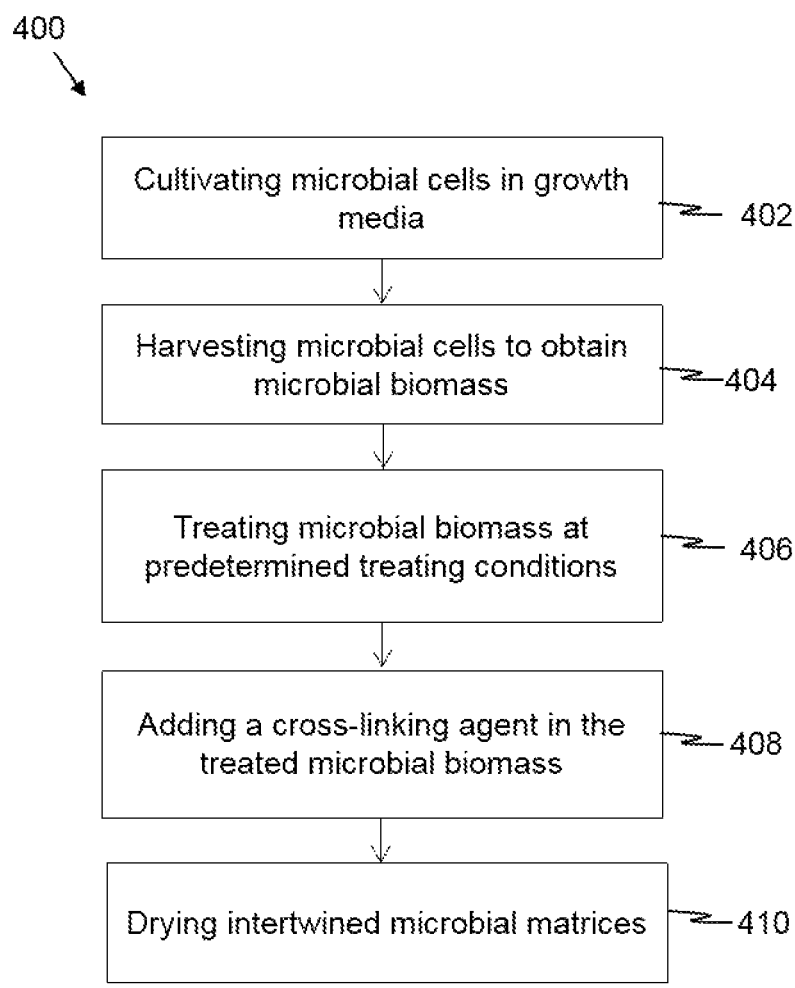
FIG. 4 is a flow chart illustrating a method of preparation of an adsorbent from a microbial biomass in accordance with yet another embodiment of the present invention.

FIG. 4 is a flow chart illustrating a method (400) of preparation of an adsorbent from a microbial biomass in accordance with yet another embodiment of the present invention.

At step 402, microbial cells are cultivated in growth media. The growth media is selected from, but not limited to, a group consisting of Luria agar (LA), colloidal chitin agar, potato dextrose agar or BG-11. Alternatively, Luria broth, colloidal chitin broth, potato dextrose broth or BG-11 broth may be used. Further, the microbial cells are selected from, but not limited to, a group consisting of filamentous and non-filamentous bacteria, fungi and algae. Also, the microbial cells are selected from, but not limited to, a group consisting of *Lysinibacillus* species, *Streptomyces* species, *Pseudomonas* species, *Stenotrophomonas* species and algae.

At step 404, the microbial cells are harvested to obtain the microbial biomass. Further, the microbial biomass is washed in deionized water.

At step 406, the microbial biomass is treated at predetermined treating conditions. The predetermined treating conditions include treatment of the microbial biomass at a high temperature of 100° C. or high temperature of 121° C. under pressure of 15 psi and/or with an acid. Further, the microbial biomass is treated with, but not limited to, 1 N HCl for 30 min. The microbial biomass may be treated with, but not limited to, 5 N HCl to reduce the treatment time.

At step 408, a cross-linking agent is added in the treated microbial biomass to form intertwined microbial matrices of the microbial biomass. Further, the cross-linking agent is selected from, but not limited to, a group consisting of epichlorohydrin and glycerol.

At step 410, the intertwined microbial matrices are dried to form the adsorbent. The intertwined microbial matrices are blended with binding agents. Further, the binding agents are selected from, but not limited to, a group consisting of polyethylene glycol, agar, gelatin, cellulose, guar gum or a combination thereof.

In accordance with an embodiment of the present invention, the intertwined microbial matrices are integrated with Shrimp-PET composites. Further, the Shrimp-PET composites are integrated with intertwined bacterial, actinomycete, algal or fungal matrices.

In accordance with an embodiment of the present invention, the adsorbent is prepared in a form of, but not limited to, beads and membranes. The adsorbent is prepared in a form of beads from an inactive or dead biomass of the microbial cells. Further, the adsorbent is prepared in the form of beads from a mixture of uniformly mixed plurality of natural biomaterials with the microbial biomass. Also, the plurality of natural biomaterials are selected from, but not limited to, a group consisting of lignocellulosic waste powder, shrimp shell powder and seafood waste powder.

Figure 5:
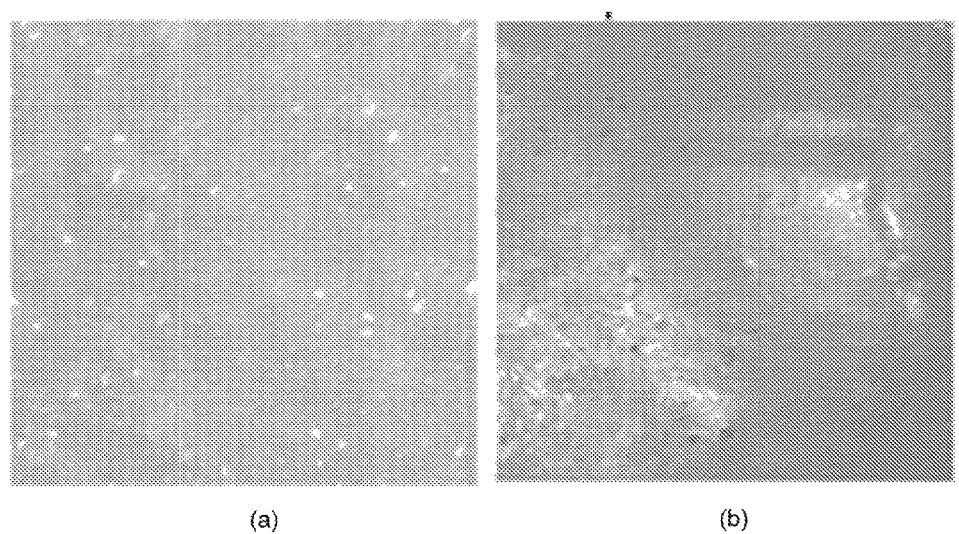
FIG. 5 illustrates the adsorbents in the form of (a) membrane and (b) composite membrane in accordance with an exemplary embodiment of the present invention.

FIG. 5 illustrates the adsorbents in the form of (a) membrane and (b) composite membrane in accordance with an exemplary embodiment of the present invention.

Figure 6:
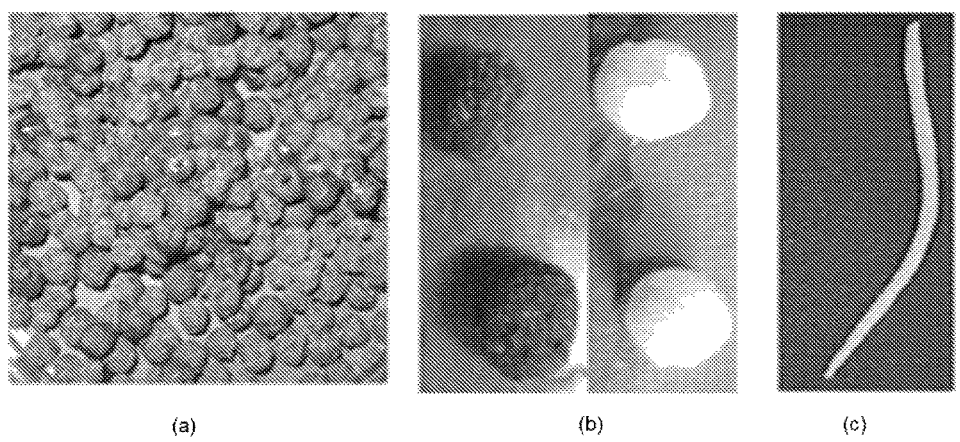
FIG. 6 illustrates the adsorbents in the form of (a), (b) beads and (c) serpentine in accordance with an exemplary embodiment of the present invention.

FIG. 6 illustrates the adsorbents in the form of (a), (b) beads and (c) serpentine in accordance with an exemplary embodiment of the present invention.

Figure 7:
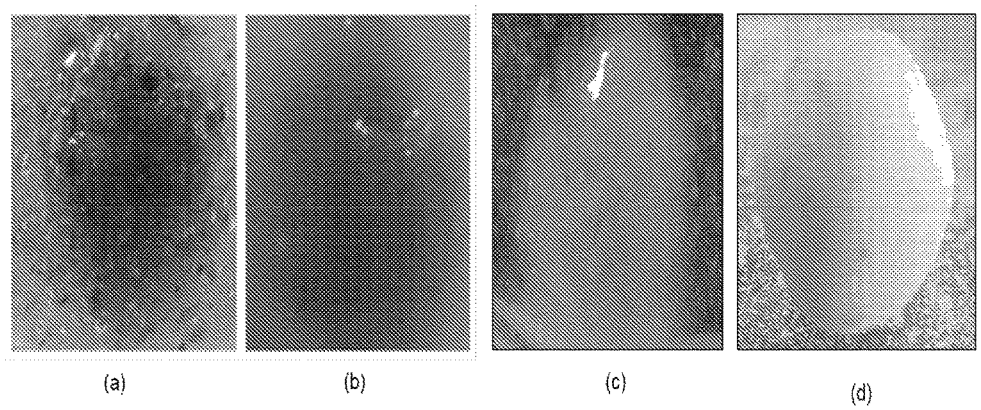
FIG. 7 illustrates the adsorbents in the form of gelatinous beads prepared from (a) plurality of natural biomaterials, (b) bacterial biomass, (c) actinomycetes biomass and (d) algal biomass in accordance with an exemplary embodiment of the present invention.

FIG. 7 illustrates the adsorbents in the form of gelatinous beads prepared from (a) plurality of natural biomaterials, (b) bacterial biomass, (c) actinomycetes biomass and (d) algal biomass in accordance with an exemplary embodiment of the present invention.

Figure 8:
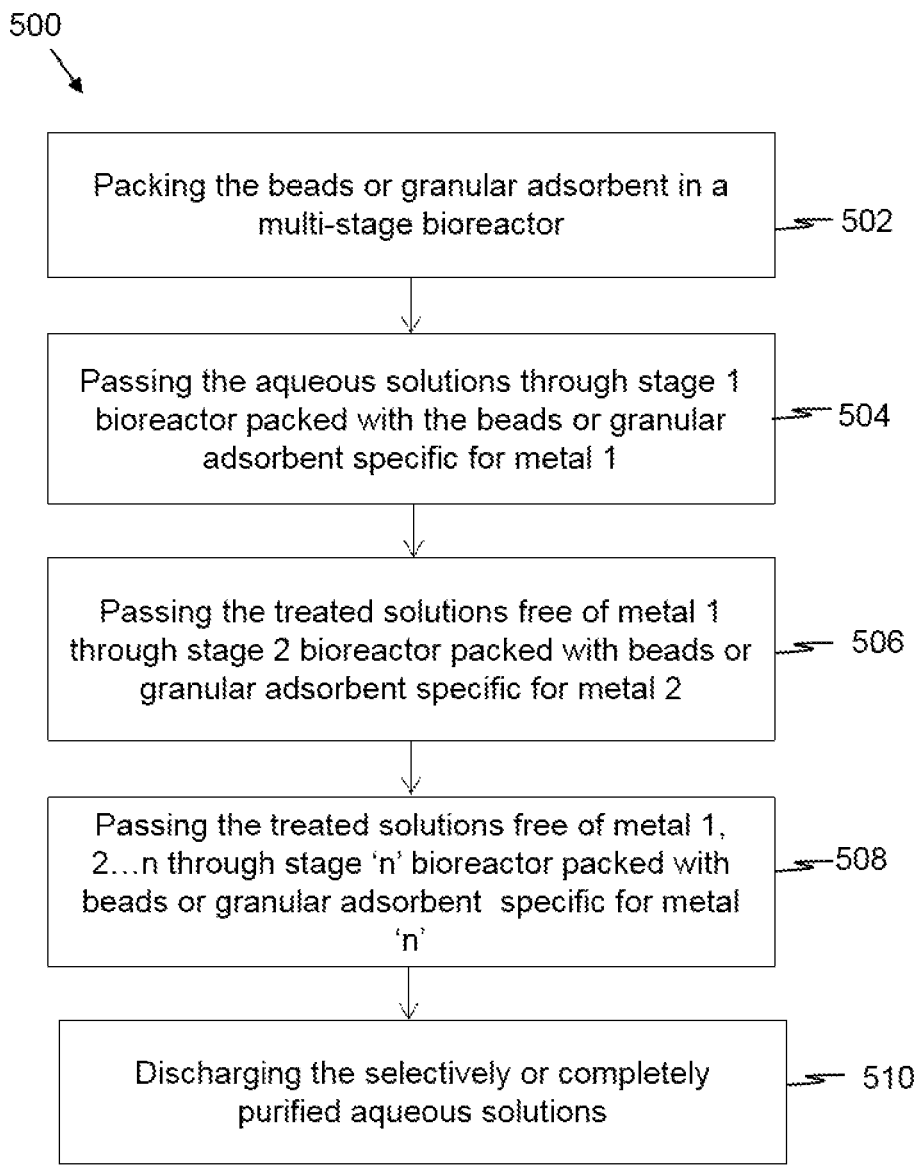
FIG. 8 is a flow chart illustrating a method for the removal of the metals from the aqueous solutions in a multi-stage bioreactor in accordance with an exemplary embodiment of the present invention.

FIG. 8 is a flow chart (500) illustrating a method for the removal of the metals from the aqueous solutions in a multi-stage bioreactor in accordance with an exemplary embodiment of the present invention.

At step 502, as shown in FIG. 8, the adsorbent in the form of granules or beads is packed in the multi-stage bioreactor for step-wise removal of the metals from the aqueous solutions. At step 504, the aqueous solutions are passed through stage 1 bioreactor packed with the granules or beads specific for particular metals, for example metal 1. At step 506, treated aqueous solutions free of metal 1 are passed through stage 2 bioreactor packed with the beads or granules specific for metal 2. Further at step 508, the treated aqueous solutions free of metal 1 to 'n' are passed through stage 'n' bioreactor packed with the beads or granules specific for metal 'n'. At step 510, the aqueous solutions are selectively or completely purified and may be discharged.

Figure 9:
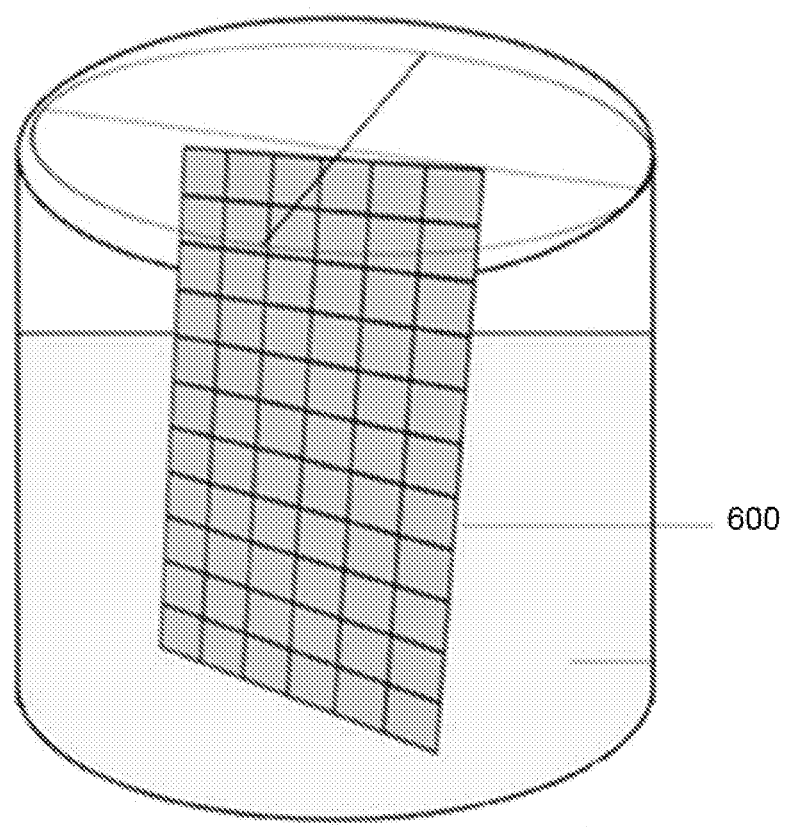
FIG. 9 illustrates a low-cost static biopolymer screen for the removal of the metals from the aqueous solutions in accordance with an exemplary embodiment of the present invention.
Figure 10:
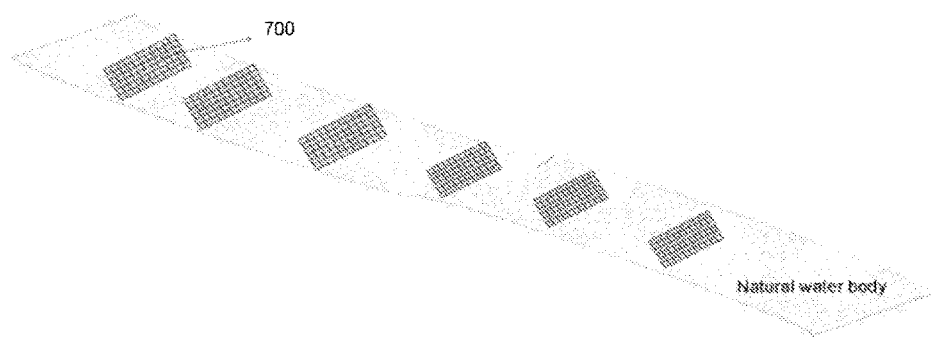
FIG. 10 illustrates low-pressure driven biopolymer multi-screens for the removal of the metals from the aqueous solutions in accordance with an exemplary embodiment of the present invention.

In accordance with an exemplary embodiment of the present invention, the adsorbent in the form of membranes is held on a screen support and immersed in a container having the aqueous solution as shown in FIG. 9 as low cost static biopolymer screen (600). Further, the adsorbent in the form of membranes is held on the screen supports which are immersed in natural water bodies (multiple assemblies) to refer as low-pressure driven biopolymer multi-screens (700) for removal of the metals from natural water bodies such as rivers, streams, ponds as shown in FIG. 10.

Figure 11:
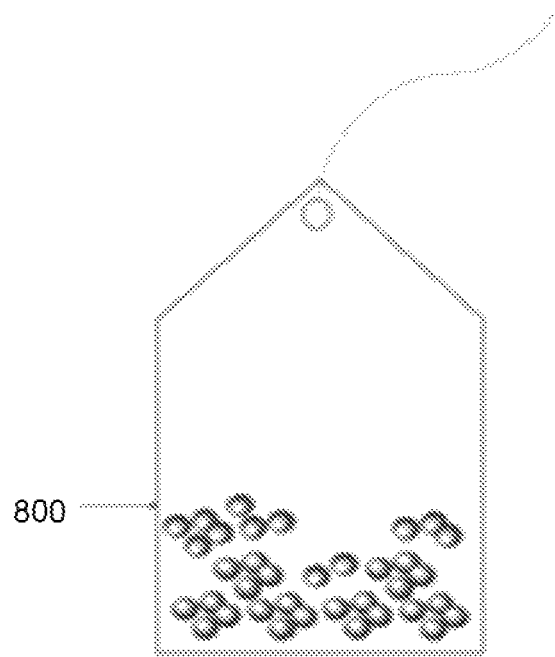
FIG. 11 illustrates—small sachets filled with the adsorbents for the removal of the metals from the aqueous solutions in accordance with an exemplary embodiment of the present invention.

In accordance with an exemplary embodiment of the present invention, the adsorbents such as in granular form are filled in dip pouches or small sachets (800) for instant removal of the metals from small quantities of the aqueous solutions, as shown in FIG. 11.

Hereinafter, an example of the present invention will be provided for more detailed explanation.

Example

1. Preparation of a Granule or Bead Type Adsorbent

Plurality of natural biomaterials including agro wastes such as banana skin, lemon, lime, pomegranate, water melon, sapodilla, pineapple, orange peels, wheat bran and rice husk were used for preparing the adsorbent. Each of the plurality of natural biomaterials was crushed to form a powder, washed with deionised water several times and then dried at 100° C. for 24 to 48 hours. 10 g of this dried powder was mixed with 5 g of guar gum and kneaded with 5 ml of 2% acetic acid solution to form a paste. Granules and beads of 3 mm-5 mm in diameter were prepared from the paste. The granules and beads were left to harden at 50° C. till the desired consistency and were used for metal removal from aqueous solutions. Further, duration of drying and crushing varies with the plurality of natural biomaterials used.

2. Preparation of a Membrane Type Adsorbent

Plurality of natural biomaterials including agro wastes such as banana skin, lemon, lime, pomegranate, water melon, sapodilla, pineapple, orange peels, wheat bran and rice husk were used for preparing the adsorbent. Each of the plurality of natural biomaterials was crushed into small pieces, briefly washed with deionised water and then dried at 50° C. until complete dryness and thereafter ground in a mixer to form a powder. 3 g of the powder was mixed with 0.5 g of guar gum and 15 ml deionized water to form a mixture. The mixture was stirred for 15-20 mins and 15 ml of additional deionized water was added to form a slurry, the slurry was stirred for 5-10 mins and kept in a water bath at 60° C. for 30 mins. 0.5 g of agar powder can be added to the slurry for better rigidity. 15 ml of glycerol was added to the slurry and kept in the water bath at 60° C. for 30 mins to form a viscous slurry. The viscous slurry was then casted on a glass plate for evenness and air dried for 60 mins to 120 mins until 95% of moisture had dried to form the flat-bed membrane type adsorbent. For composite membranes the viscous slurry was spread on an ultrafiltration membrane backing material, rolled evenly and air dried for 60 mins to 120 mins. In case of particulate matter in the slurry, the slurry was kept in a hot air oven at 60° C. till 5 min. Further, duration of drying depends on the plurality of natural biomaterials used and the moisture content.

3. Preparation of a Membrane Type Adsorbent (Single, Composites and Dual Composites)

For the preparation of the membrane type adsorbent lignocellulosic waste, sea-food waste, microbial biomass and their blends or mixtures were used. Bacteria (filamentous and non-filamentous) which showed characteristic changes in morphology in presence of metals were chosen to prepare matrices or adsorbents for the removal of metals. Such metal responsive bacteria were then grown in bulk on Luria agar and colloidal chitin agar containing 1 mm metal such as cadmium, nickel or lead and cells were harvested by using a sterile cell scraper. Further, BG-11 medium was used to grow algae. The cells were washed in deionized water and used for preparation of bacterial matrices. Brief acidic treatment of bacterial biomass in presence of 1 N HCl for 30 min was given followed by washing and treatment of biomass with 0.5% crosslinking agents such as epichlorohydrin or glycerol. This led to the formation of intertwined matrices from the bacterial biomass which was flattened and the mesh was directly used for metal adsorption after drying. These bacterial matrices were called bacterimatrix or bacterimatrices.

Further, composite matrices were prepared from shrimp shell powder to give rigidity to the bacterial matrices. Shrimp shell powder was obtained by separation of edible parts from the shell and tails. The shells were soaked in 6N HCl for 2-6 hours at a temperature ranging from 60° C. to 100° C. Paste of the shells was converted into a fibrous matrix by using 0.1% cross-linking agents such as epichlorohydrin or glycerol and the binding agents. The fibrous matrix was then deposited on a polyethylene terephthalate support (PET) of known pore size and thickness to form a composite. Phase transposition in the matrix was induced by brief exposure of the composite at 60° C. which was later neutralized by briefly immersing it in deionized water. The composite was stabilized at 50° C. for 1 hour to finally give uniform semi-biological composite matrices of 0.025±0.005 cm thickness. This semi-biological composite matrix was called Shrimp-PET and was subjected to assessment of its ability to remove metals from metal contaminated water.

The bacterimatrices were made rigid by integrating them with Shrimp-PET leading to formation of bacterimatrix-Shrimp-PET composites. Similarly, fungi and algae can be used to prepare fungimatrices and algaematrices referred to as fungi-Shrimp-PET and algae-Shrimp-PET respectively. Further, actinomycete may be used to prepare actinomycete matrices referred to as actinomycete-Shrimp-PET. Inactive or dead mycelia/biomass of microbes or bacteria are prepared by autoclaving dry bacterial biomass at 121° C. for 20 min. Equal quantity of the dead biomass and strong binder were taken and mixed well by adding water enough to give desired consistency and strength. Beads were prepared from the mixture and sun dried. The beads were also prepared in combination with lignocellulosic waste powder, shrimp shell powder or other sea-food waste powder either by uniform mixing or by coating the waste beads with the microbial biomass.

Agro-wastes such as fruit peels, corn cobs, sawdust, vegetable and lignocellulosic wastes were treated to prepare slurry for making the agri-Shrimp-PET of different varieties and were tested for their metal binding ability. The agro-waste, the strong binder and water were mixed in a ratio of 6:1:20. This mixture was stirred for 15-20 mins and additional water was added if required to get the desired consistency, further stirred for 5-10 mins and kept at 60° C. for 30 mins. Plasticizers such as glycerol or sorbitol or a combination thereof is added to half to two-third of the total volume of the mixture and further kept at 60° C. for 30 mins to form the slurry. The slurry is then casted flat for evenness and air dried for 60 mins to 120 mins until 95% of moisture had dried. These were made into composites by coating with the microbial biomass. For coating of the microbial biomass on beads of the agro-waste, slurry was prepared by mixing equal quantity of the dead microbial biomass and the strong binder with water sufficient to give desired consistency. The beads were added in the above slurry and coated by rolling for 2-5 mins and sun-dried.

Different characteristics such as thickness, flow rate, filtration pressure, pure water flux and bubble point pressure for Shrimp-PET were studied to understand adsorptive-cum-filtration capacity. Maximum allowable flow rate was determined by passing water over Shrimp-PET through pressure filtration in a stirred cell with filtration area of 78.50 cm². The flux was measured under steady-flow rate with constant pressure at 6.89 kPa.

Surface morphology of the PET, Shrimp-PET, bacterimatrix-Shrimp-PET composites, fungi-Shrimp-PET, actinomycete-Shrimp-PET and algae-Shrimp-PET was determined by electron microscopy using ESEM (Environmental Scanning Electron Microscope, Model: FEI-200 Quanta).

4. Preparation of a Gelatinous Bead Type Adsorbent

The plurality of natural biomaterials such as lignocellulosic waste, sea-food waste, microbial biomass, or their blends were mixed with 5 N HCl in a ratio of 1:2 (w/v). This mixture was mixed properly for 15-20 mins till the natural biomaterial was completely well wetted and uniform and then kept for at least 5 hours. An equal volume of 50% binding agent was added and mixed for at least 15-20 mins. Further, if required stronger binders or biological adhesives are added in one-third proportion of the mixture along with one-tenth proportion of the plasticizer. To the mixture water was added to get the desired consistency for making the gelatinous beads that retain the natural biomaterial and do not let it dissolve in aqueous solution.

5. Preparation of an Adsorbent in a Form of Granules and Serpentines

One part of the plurality of the natural biomaterials such as lignocellulosic waste, sea-food waste, microbial biomass, or their blends were mixed with two parts of the binding agent and left at room temperature for at least one hour. Further, if required the stronger binders or biological adhesives are added in one-fifth proportion of the mixture along with one-tenth proportion of plasticizer. To the mixture water was added to get the desired consistency for making the serpentines that do not swell but provide more surface area. Amount of the binding agent was increased ten times to make granules.

6. Preparation of an Adsorbent in a Form of Hard Beads

The plurality of natural biomaterials were mixed with strong binder in a ratio of 2:1 and kneaded with 2% acetic acid solution (one-third volume of the total mixture). The beads were prepared from the mixture and left to harden at 50° C. till the desired consistency.

7. Metal Analysis

Total metal content in water sample of contaminated aqueous solution was determined using Inductively Coupled Plasma Mass Spectrometer (ICP-MS), Atomic Adsorption Spectrophotometer and voltammetry on Metrohm Computrace 797VA system. For analysis of the total metal content, the water sample was treated with 30% concentrated nitric acid till pH 2.0 and appropriately diluted with deionized water. The sample was filtered through 0.22 μm filter and used for analysis.

8. Metal Adsorption Ability of the Adsorbents

Initially deionized water was spiked with 500 mg $L^{-1}$ of Cd (II). Steady state adsorption of Cd (II) on the Shrimp-PET was carried out at 25° C. at 20 rpm stirrer speed and the metal analysis was done after 4-5 hours of exposure with the adsorbents. In another set, concentration of Cd (II) was gradually increased from 100 mg $L^{-1}$ to 500 mg $L^{-1}$. Amount of Cd (II) bound on the Shrimp-PET was analyzed by scanning electron microscopy-energy dispersive X-ray (SEM-EDX; Joel Model—JSM-7600F).

Results

1. Characterization of Bacterimatrices and Semi-Biological Composite Matrices

Figure 12:
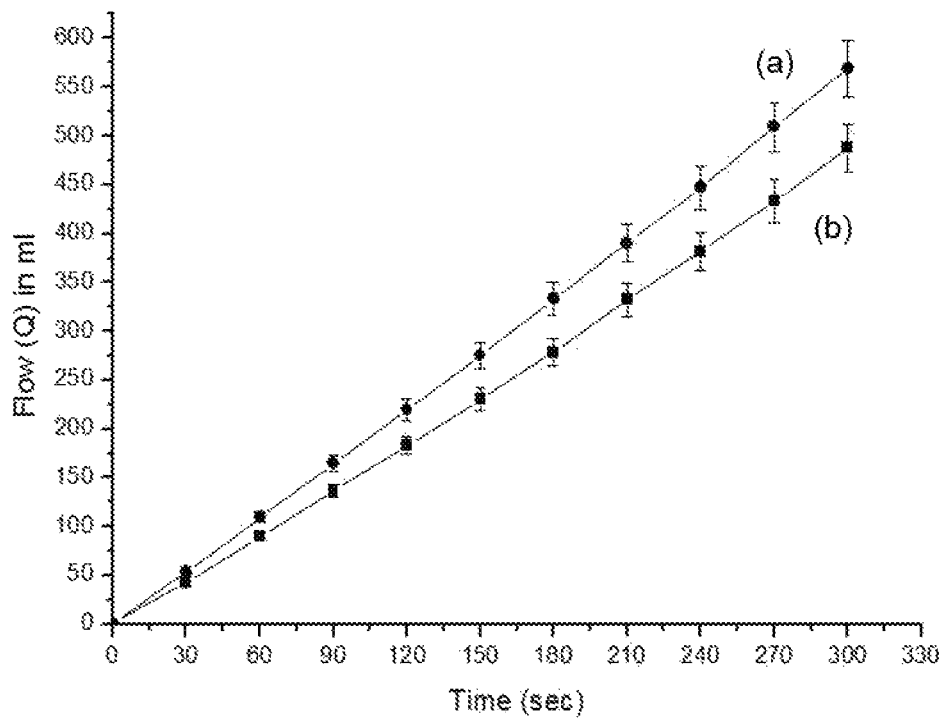
FIG. 12 is a graph showing flow of deionized water through (a) only PET membrane and (b) Shrimp-PET composite membrane in accordance with an embodiment of the present invention.

Shrimp-PET composite membrane was used as a model matrix or adsorbent for studying the properties of composite matrices. Table 1 shows the effect of thickness of the plurality of natural biomaterials in the composite matrix Shrimp-PET. Total metal content in the aqueous solution was 500 mg/l. Thickness of the coat of the plurality of natural biomaterials results in the enhancement of diffusion as more biological polymers coated on surface of polyethylene support, more metal ions will be able to adsorb on the composite matrix. A uniform thickness of 250±5 μm gave best adsorption. Diameter of the composite matrix was maintained to 10 cm and total area of adsorption was 78.50 $cm^2$. In case of pressure filtration through the composite matrix, a flow rate with transmembrane pressure of 6.89 kPa was most suitable. FIG. 12 depicts flow of the deionized water through the composite matrix in a pressurized state. The flow of water through the PET (FIG. 12a) and the composite Shrimp-PET matrix (FIG. 12b) increases up to 330 sec beyond which rate was consistent. The flow rate difference between PET and composite Shrimp-PET matrix was 0.27 ml $s^{-1}$. First bubble appeared at 3.25 kPa and size of the bubbles decreases as the filtration pressure increases till 6.89 kPa. Porosity of the composite Shrimp-PET and PET in term of percentage was 37.025% and 54.78%. The percent decrease in the porous nature of the composite matrix was due to increase in the cross-linkage between heterogeneous functional groups of the shrimp waste slurry. Pores of the composite membranes are quite small in comparison to the pores of the polyethylene support. The porosity of bacterimatrix-Shrimp-PET composites was maintained in the range of 30% to 50%.

TABLE 1

Effect of thickness on the metal removal capacity of the membranes

| Membrane thickness (cm) | Q (ml) | Cd(II) in Permeate (mg/L) | Pb(II) in permeate (mg/L) |
|---|---|---|---|
| 0.025 | 300 | 100.24 | 101.68 |
| 0.115 | 310 | 106.23 | 109.43 |
| 0.221 | 295 | 133.56 | 122.32 |

2. SEM-EDX of the Matrices

Figure 13:
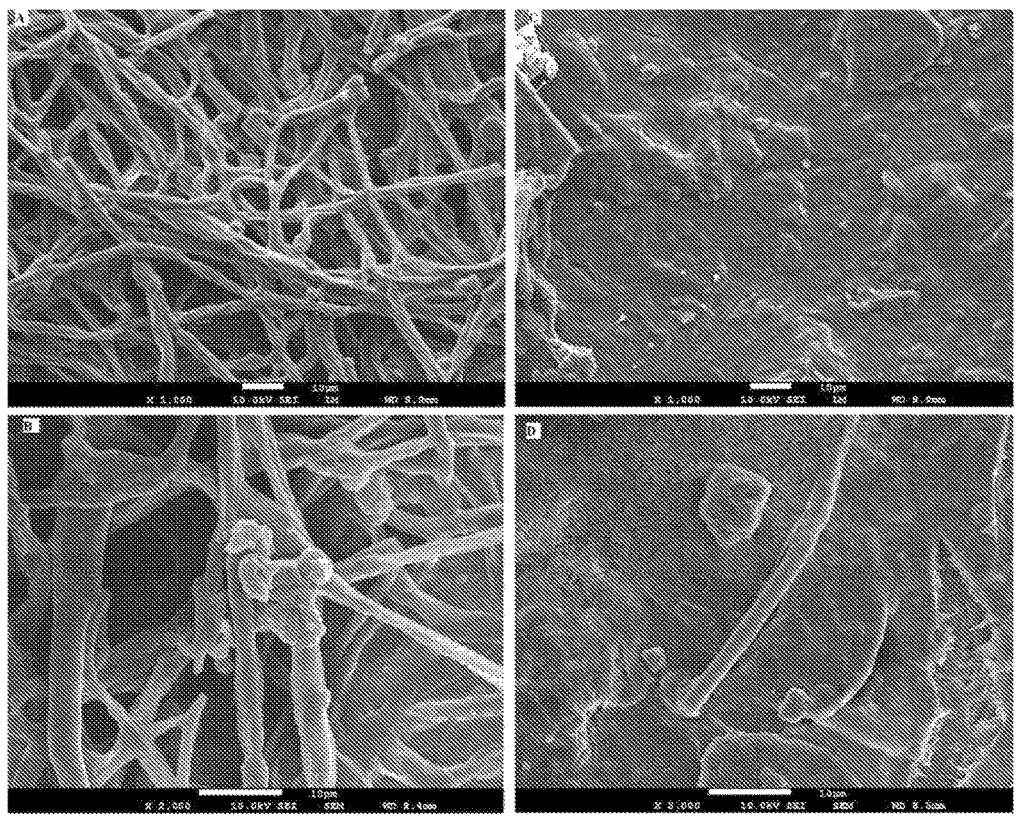
FIG. 13 illustrates SEM-EDS images of surface of the (a), (b) PET and (c), (d) composite Shrimp-PET in accordance with an embodiment of the present invention.

FIG. 13 shows the SEM-EDS images of surface of the PET (FIGS. 13A and 13B) and the composite Shrimp-PET (FIGS. 13C and 13D). Interconnectivity of the pores diminishes in the composite Shrimp-PET, which was attributed to biopolymer rich induction on the surface of the PET support.

Figure 14:
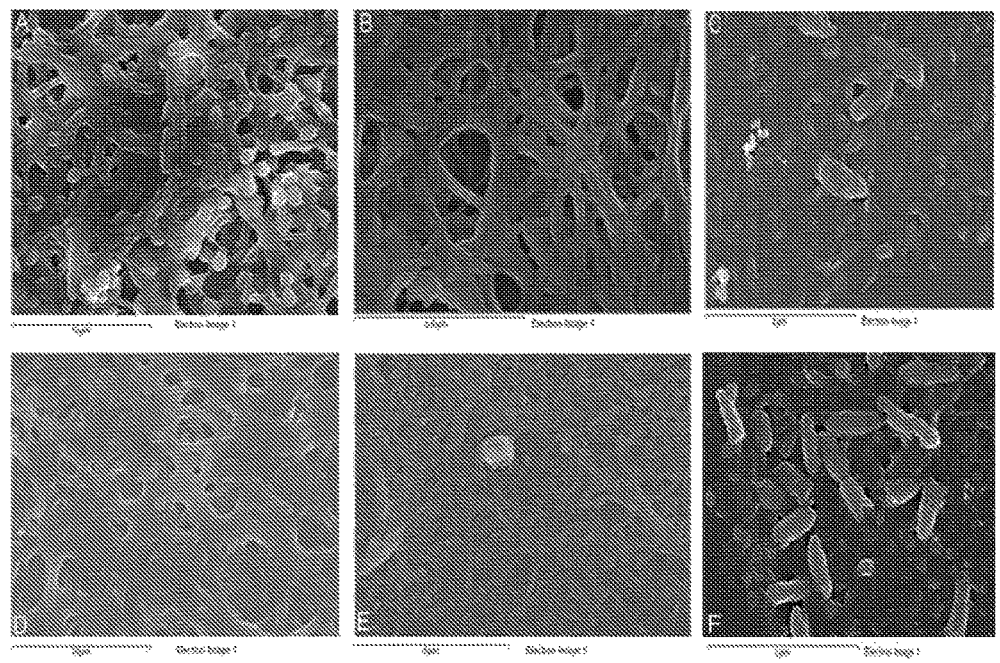
FIG. 14 illustrates the adsorbents prepared from a bacterial biomass (A) *Lysinibacillus* sp., (B) *Streptomyces* sp., (C)

FIG. 14 shows the matrices or adsorbents prepared from the bacterial biomass such as, (A) *Lysinibacillus* sp., (B) *Streptomyces* sp., (C) *Stenotrophomonas* sp. and the matrices or adsorbents of the same bacterial biomass respectively improved with Shrimp-PET (D to F).

3. Adsorption Studies

In steady state conditions, 3.82 mg of Cd (II) and 3.33 mg of Pb (II) was adsorbed per $cm^2$ of the composite Shrimp-PET and 0.32 mg of Cd (II) and 0.67 mg of Pb (II) was adsorbed per $cm^2$ of the PET. The adsorption of the metals on the surface of the composite matrix is due to heterogeneous functional group and the biological polymers in the composites. FIG. 15 shows the cadmium adsorbed over the (A) PET and (B) Shrimp-PET and the corresponding spectra.

Further, percentage of the metals removed from the contaminated aqueous solutions using adsorbents prepared from different plurality of natural biomaterials is shown in Table 2.

TABLE 2

Removal of the metals such as lead (Pb) and cadmium (Cd) from the contaminated aqueous solution Percent metal removal using granule or bead type adsorbents

| Metal | Orange peel | Lime peel | Lemon peel | Watermelon peel | Pineapple peel | Pomegranate peel | Wheat husk | Chikoo peel | Banana peel |
|---|---|---|---|---|---|---|---|---|---|
| Cd(II) | 10.21 | 22.32 | 33.38 | 35.27 | 63.51 | 29.82 | 14.97 | 2.93 | 21.45 |
| Pb(II) | 13.01 | 23.11 | 35.4 | 42.49 | 67.48 | 64.81 | 65.68 | 19.13 | 39.33 |

4. Static Adsorption of Metal Ions 6.40 mg of Cd (II) and 6.10 mg of Pb (II) was adsorbed per gram of dry biopolymer matrix prepared from intertwined *Streptomyces* biomass.

FIG. 16 illustrates intactness of the adsorbent in the form of beads prepared from (a) actinomycete biomass and (c) algal biomass in water after 24 hours and 48 hours respectively, and copper adsorbed over the beads prepared from the (b) actinomycetes biomass and the (d) algal biomass in accordance with an embodiment of the present invention.

CONCLUSION

A method for removal of metals from aqueous solutions has been successfully performed by using adsorbent in the form of membranes, beads, granules, serpentines and filter beds. The adsorbent utilizes natural biomaterials or microorganisms capable of binding the metals from the aqueous solutions. Further, composite matrices made with bacterial biomass are able to remove the metals from polluted waters using both adsorptive and filtration techniques with nominal pressure up to 14 kPa. The composite matrices can thus withstand a pressure of static river water and can be suspended at foci of the metal pollution to induce reverse gradients and prevent spread of the metal pollution to other parts of the river or natural water body.

The exemplary implementation described above is illustrated with specific shapes, dimensions, and other characteristics, but the scope of the invention includes various other shapes, dimensions, and characteristics. For example, the adsorbent in the form of membranes, beads, granules, serpentines and filter beds etc. could be of particular shape and of appropriate sizes. Also, the adsorbents as described above could be manufactured in various other ways and could include various other materials, including various other natural biomaterials and microorganisms.

Similarly, the exemplary implementations described above include specific examples of natural biomaterials, microorganisms etc. but any other appropriate natural biomaterials or microorganisms, alone or in combination, could be employed. Also, the natural biomaterials may not be chemically treated.

Various modifications to these embodiments are apparent to those skilled in the art from the description and the accompanying drawings. The principles associated with the various embodiments described herein may be applied to other embodiments. Therefore, the description is not intended to be limited to the embodiments shown along with the accompanying drawings but is to be provided broadest scope consistent with the principles and the novel and inventive features disclosed or suggested herein. Accordingly, the invention is anticipated to hold on to all other such alternatives, modifications, and variations that fall within the scope of the present invention and appended claims.

The invention claimed is:

1. An adsorbent composition for removing metals from aqueous solutions, comprising:
    pulverized natural biomaterial selected from a group consisting of agro-waste, seafood waste, lignocellulosic waste, non-edible plant waste and combination thereof;
    a binding agent; and
    solvent selected from a group consisting of water, an acid solution and an alkali solution;
        wherein said pulverized natural biomaterial is washed with deionized water and dried; and wherein said dried natural biomaterials, said binding agent and said solvent are mixed together into a mixture wherein deionized water is further added in said mixture, the mixture is stirred and kept in water bath at 60° C. for 30 min to form a slurry, and to said slurry is added a plasticizer selected from a group of glycol and sorbitol, and kept in water bath at 60° C. for 30 min.

2. The absorbent composition as claimed in claim 1, wherein said mixture is provided in the form of matrices, beads, granules, serpentines and filter beds and said matrices are flat-bed membranes, membrane discs, composite membranes and dual composite membranes.

3. The adsorbent composition as claimed in claim 1, wherein said slurry is kept in a hot air oven at 60° C. and casted on a glass plate then air dried for 60 mins to 120 mins to form matrices.

4. The adsorbent composition as claimed in claim 1, wherein said agro-waste is selected from a group consisting of banana skin, lemon, lime, pomegranate, water melon, sapodilla, pineapple, orange peels, wheat bran, rice husk and a combination thereof and said seafood waste is selected from a group consisting of shrimp shells, crab shells, shell fish waste, fish scales, non-edible parts of fish, non-edible parts of seafood and a combination thereof.

5. The adsorbent composition as claimed in claim 1, wherein said binding agent is selected from a group consisting of polyethylene glycol, agar, gelatin, cellulose, guar gum and a combination thereof; and said metals are selected from a group consisting of iron, nickel, lead, cadmium, mercury, zinc, copper, manganese, cobalt, boron, molybdate, arsenic, chromium, silver, aluminum and strontium; and said aqueous solutions are selected from a group consisting of industrial effluents, domestic wastewater, natural water, water used in agriculture, blood and body fluids.

6. A method of preparing an adsorbent composition for removing metals from aqueous solutions, the method comprising the steps of:
    pulverizing natural a natural biomaterial selected from a group consisting of agro-waste, seafood waste, lignocellulosic waste, non-edible plant waste and a combination thereof to
    form a powder;
    washing said powder with deionized water and allowing it to dry; and
    mixing said dried powder with a binding agent and a solvent to form a mixture;
    wherein said solvent is a solution containing 2% of acetic acid for preparing granules.

7. The method as claimed in claim 6, wherein said mixture is provided in the form of matrices, beads, granules, serpentines and filter beds and said matrices are flat-bed membranes, membrane discs, composite membranes and dual composite membranes.

8. The method as claimed in claim 6, further comprising a step of drying said powder at 100° C. for 24 to 48 hours for preparing granules.

9. The method as claimed in claim 6, further comprising a step of kneading said mixture with 2% acetic acid solution forming granules of diameter in the range of 3 mm to 5 mm.

10. The method as claimed in claimed in claim 6, wherein said granules are hardened at 50° C.

11. The method as claimed in claim 6, further comprising a step of drying said powder at 50° C. to prepare matrices.

12. The method as claimed in claim 6, further comprising a step of stirring said mixture for 15 mins to 20 mins; adding said deionized water and stirring it for 5 mins to 10 mins and keeping it in a water bath at 60° C. for 30 mins to form a slurry and said slurry is kept in a hot air oven at a temperature of 60° C. for 5 mins to prepare matrices.

13. The method as claimed in claim 12, wherein said slurry is added with a plasticizer selected from a group consisting of glycerol and sorbitol and kept in water bath at 60° C. for 30 mins to form a viscous slurry to prepare matrices and said viscous slurry is casted on a glass plate and air dried for 60 mins to 120 mins until 95% of moisture dries to prepare matrices.

14. The method as claimed in claim 13, wherein said viscous slurry is spread on an ultrafiltration membrane backing material, rolled evenly and air dried for 60 mins to 120 mins to form a composite membrane.

15. The method as claimed in claim 12, wherein said slurry is further added with an agar powder for rigidity.

16. The method as claimed in claim 6, wherein said agro-waste is selected from a group consisting of banana skin, lemon, lime, pomegranate, water melon, sapodilla, pineapple, orange peels, wheat bran, rice husk and a combination thereof and wherein said seafood waste is selected from a group consisting of shrimp shells, crab shells, shell fish waste, fish scales, non-edible parts of fish, non-edible parts of seafood and a combination thereof.

17. The method as claimed in claim 6, wherein said binding agent is selected from a group consisting of polyethylene glycol, agar, gelatin, cellulose, guar gum and a combination thereof; and said metals are selected from a group consisting of iron, nickel, lead, cadmium, mercury, zinc, copper, manganese, cobalt, boron, molybdate, arsenic, chromium, silver, aluminum and strontium; and said aqueous solutions are selected from a group consisting of industrial effluents, domestic wastewater, natural water, water used in agriculture, blood and body fluids.

* * * * *